US009454657B2

(12) United States Patent
Yeap et al.

(10) Patent No.: US 9,454,657 B2
(45) Date of Patent: Sep. 27, 2016

(54) SECURITY ACCESS DEVICE AND METHOD

(75) Inventors: Tet Hin Yeap, Ottawa (CA); Lou Dafu, Ottawa (CA); William G. O'Brien, Orleans (CA)

(73) Assignee: BCE Inc., Verdun (CA)

( * ) Notice: Subject to any disclaimer, the term of this patent is extended or adjusted under 35 U.S.C. 154(b) by 926 days.

(21) Appl. No.: 11/002,077

(22) Filed: Dec. 3, 2004

(65) Prior Publication Data

US 2006/0123463 A1 Jun. 8, 2006

(51) Int. Cl.
| | |
|---|---|
| *H04L 29/06* | (2006.01) |
| *G06F 21/35* | (2013.01) |
| *G07C 9/00* | (2006.01) |
| *H04L 9/32* | (2006.01) |

(52) U.S. Cl.
CPC ............ *G06F 21/35* (2013.01); *G07C 9/00039* (2013.01); *G07C 9/00111* (2013.01); *G07C 9/00309* (2013.01); *H04L 9/3226* (2013.01); *H04L 9/3263* (2013.01); *H04L 2209/805* (2013.01)

(58) Field of Classification Search
CPC .............. G06F 21/35; G07C 9/00039; G07C 9/00111; G07C 9/00309; H04L 9/3226; H04L 9/3263; H04L 2209/805
USPC .............................................. 726/2, 9, 10, 20
See application file for complete search history.

(56) References Cited

U.S. PATENT DOCUMENTS

| | | | |
|---|---|---|---|
| 5,742,756 A * | 4/1998 | Dillaway et al. ............... | 726/20 |
| 5,960,085 A | 9/1999 | de la Huerga | |
| 6,035,406 A * | 3/2000 | Moussa et al. ................. | 726/18 |
| 6,092,202 A * | 7/2000 | Veil et al. ........................ | 726/27 |
| 6,189,105 B1 * | 2/2001 | Lopes .............................. | 726/20 |
| 6,497,656 B1 | 12/2002 | Evans et al. | |
| 6,675,300 B1 * | 1/2004 | Jung et al. ....................... | 726/17 |
| 6,810,480 B1 * | 10/2004 | Parker et al. .................. | 713/186 |
| 6,819,219 B1 * | 11/2004 | Bolle et al. ................... | 340/5.52 |
| 7,126,470 B2 * | 10/2006 | Clift et al. ............... | 340/539.13 |

(Continued)

FOREIGN PATENT DOCUMENTS

| | | |
|---|---|---|
| EP | 1 239 630 A2 | 9/2002 |
| EP | 1239630 A2 | 9/2002 |

(Continued)

OTHER PUBLICATIONS

Office Action mailed on Aug. 11, 2008 in connection with U.S. Appl. No. 10/860,247.

(Continued)

*Primary Examiner* — Yogesh Paliwal
(74) *Attorney, Agent, or Firm* — Gowling WLG (Canada) LLP (57) ABSTRACT

A security system and method is provided. An embodiment includes a security access device that includes a first transmitter for transmitting authentication to a computer and a second transmitter for transmitting verification information to a computer. The first transmitter is typically active and consumes power from the access device, while the second transmitter is typically passive, and consumes less or nil power from the access device. When the security access device is initially brought proximal to the computer and activated, the authentication information is sent to the computer and the user is logged in. Periodically, the computer will query the passive transmitter for verification information, to ensure that the security access device is still proximal to the computer.

2 Claims, 11 Drawing Sheets

(56) References Cited

U.S. PATENT DOCUMENTS

| | | | |
|---|---|---|---|
| 7,228,429 B2 * | 6/2007 | Monroe | 713/182 |
| 7,444,415 B1 | 10/2008 | Bazzinotti et al. | |
| 2002/0004762 A1 * | 1/2002 | Izumoto | 705/26 |
| 2002/0032855 A1 * | 3/2002 | Neves et al. | 713/154 |
| 2002/0065625 A1 | 5/2002 | Xydis | |
| 2002/0065905 A1 | 5/2002 | Kliland et al. | |
| 2002/0111946 A1 * | 8/2002 | Fallon | 707/9 |
| 2002/0123325 A1 | 9/2002 | Cooper | |
| 2002/0129285 A1 * | 9/2002 | Kuwata et al. | 713/202 |
| 2002/0138742 A1 * | 9/2002 | Hamid et al. | 713/186 |
| 2002/0180586 A1 * | 12/2002 | Kitson et al. | 340/5.82 |
| 2003/0005300 A1 | 1/2003 | Noble et al. | |
| 2003/0034877 A1 | 2/2003 | Miller et al. | |
| 2003/0046557 A1 * | 3/2003 | Miller et al. | 713/186 |
| 2003/0051134 A1 * | 3/2003 | Gupta | 713/156 |
| 2003/0091751 A1 * | 5/2003 | Tsuruta et al. | 427/487 |
| 2003/0093663 A1 | 5/2003 | Walker | |
| 2003/0191799 A1 | 10/2003 | Araujo et al. | |
| 2003/0226017 A1 | 12/2003 | Palekar et al. | |
| 2004/0002305 A1 | 1/2004 | Byman-Kivivuori et al. | |
| 2004/0064720 A1 * | 4/2004 | Hessel et al. | 713/200 |
| 2004/0068668 A1 | 4/2004 | Lor et al. | |
| 2004/0073792 A1 * | 4/2004 | Noble et al. | 713/168 |
| 2004/0153670 A1 | 8/2004 | Casey et al. | |
| 2004/0172558 A1 | 9/2004 | Callahan et al. | |

FOREIGN PATENT DOCUMENTS

| | | |
|---|---|---|
| EP | 1318459 A1 * | 6/2003 |
| EP | 1 351 467 A2 | 10/2003 |
| WO | WO 00/42491 A1 | 7/2000 |
| WO | PCT/CA2004/000455 | 8/2004 |
| WO | PCT/CA2005/001716 | 2/2006 |

OTHER PUBLICATIONS

Office Action mailed on Dec. 23, 2008 in connection with U.S. Appl. No. 10/860,247.

Office Action issued by the Canadian Intellectual Property Office on Mar. 4, 2010 in connection with CA Patent Application No. 2,571,848, 5 pages.

Office Action mailed on Jun. 9, 2009 in connection with U.S. Appl. No. 10/860,247.

Office Action mailed on Aug. 17, 2009 in connection with Canadian Patent Application 2,552,987.

Office Action mailed on Mar. 2, 2010 in connection with U.S. Appl. 10/860,247, 13 pages.

Greg Shultz, Windows XP Remote Desktop, Part 2: Cofiguring and Using the Client System; Nov. 28, 2001; http://www.win.net/optimator/WinZip/Tips/WXPRDP2.htm; Retrieved date Feb. 20, 2010; pp. 1-10.

* cited by examiner

SECURITY ACCESS DEVICE AND METHOD

FIELD OF THE INVENTION

The present invention relates generally to computer security and more particularly to security system access device and method.

BACKGROUND OF THE INVENTION

Security continues to present challenges as hackers and other malicious parties attempt to gain unauthorized access to sensitive computers and associated networks. The prior art is full of examples that attempt to reduce such unauthorized access. One of the most rudimentary forms of security is the requirement for users to present a unique login and password combination. Once the user is logged in, other security techniques can be employed such as the use of encryption of the user's communications to reduce eavesdropping.

Many problems persist with prior art security techniques. For example, it is accepted that the greater the security protocols, the greater difficulty it can be for the user to actually make use of the computer. For example, it can be required to have the user reenter the login and password after a period of inactivity. If that period of inactivity is excessively short, the user will spend more time authenticating him or herself rather than actually performing the computing task. By the same token, where the user switches between several different computing devices to access the computer network, it can be tedious to require the user to reenter the login and password each time the user switches to the other devices. Still further problems arise when the switch of user devices also involves the user switching the type of network being utilized.

A still further security problem arises when the user leaves the computer unattended, without having logged out. Inactivity timeout periods are commonly employed, wherein the user is automatically logged out if they have not used the computer for a predefined period of time. However, there is still a risk of malicious activity occurring after the user has left the computer unattended, but before the inactivity period has expired.

SUMMARY OF THE INVENTION

It is an object of the present invention to provide a novel security access device and method that obviates or mitigates at least one of the above-identified disadvantages of the prior art.

An aspect of the invention provides an access control device comprising a first transmitter operable to transmit identification information to a remote apparatus. The remote apparatus is configured to permit access to the apparatus upon validation of the identification information. The access control device also comprises a second transmitter operable to transmit an identifier to the remote apparatus. The remote apparatus is configured to maintain the access provided the remote apparatus receives the identifier.

The identification information of the access control device can include the identifier. The identification information can further include authentication information, and the remote apparatus can be configured to permit access upon validating the authentication information and identifier.

The identification information can include authentication information, and the remote apparatus can be configured to permit access upon validating the authentication information. The authentication information can include an encryption key associated with at least one of the access control device and the remote apparatus.

The identifier can be uniquely associated with the access control device.

The remote apparatus can include a look-up table that stores both the identification information and the identifier. In the table, the identification information points to the identifier.

The identification information can further be part of an encryption certificate.

The identification information can further be part of an encryption certificate that includes the identifier. The encryption certificate can further include authentication information and the remote apparatus can be configured to permit access upon validating of the authentication information and the identifier. The remote apparatus can be further operable to conduct secure communications over a network connected to the remote apparatus using the encryption certificate.

The first transmitter of the access control device can comprise an active wireless transmitter. The active wireless transmitter can be based on at least one of infrared. Bluetooth®, 802.11 or a variant thereof 802.16 or a variant thereof, CDMA or a variant thereof, GSM or a variant thereof or other desired technology.

The first transmitter can further comprise a wired connection. The wired connection can be based on Universal Serial Bus or other desired technology.

The second transmitter can be a transceiver that includes a receiver such that the second transmitter transmits the identifier upon request from a remote transmitter at the remote apparatus. The transceiver can be a passive transceiver energized by the remote transmitter at the remote apparatus. The passive transceiver can be a radio frequency identification device.

The second transmitter can further be a wireless transmitter operable to transmit the identifier to the remote apparatus at predetermined times. The wireless transmitter can be based on at least one of infrared. Bluetooth®, 802.11 or a variant thereof; 802.16 or a variant thereof or other desired technology.

The access control device can further comprise an actuator and wherein the first transmitter only transmits the identifier upon activation of the actuator.

The remote apparatus can further be an activation mechanism for a machine operable to selectively permit a user to operate the machine. The machine can be any of an automobile engine, automobile functionality (e.g. braking, ignition, gears), machinery, electronics, an Automatic Teller Machine; a door (such as a door to a restricted area), a switching mechanism for an electric light, a computer, a computer network, a personal digital assistant and a telephone. Other machines will now occur to those of skill in the art.

Another aspect of the invention provides an access control device having a transmitter operable to repeatedly transmit an identifier to a remote apparatus. The remote apparatus is configured to permit access to the apparatus provided the remote apparatus continues to receive the identifier. The transmitter can be a transceiver that includes a receiver such that the transmitter transmits the identifier upon request from a remote transmitter at the remote apparatus. The transceiver can be a passive transceiver energized by the remote transmitter at the remote apparatus. An example of a passive transceiver is a radio frequency identification device.

Another aspect of the invention provides an access control device having a receiver operable to receive a query. The access control device also has a transmitter operable to transmit an identifier to a remote apparatus in response to the query. The remote apparatus is configured to permit access to the remote apparatus provided the remote apparatus continues to receive the identifier.

The access control device can be portable. For example, the access control device can be housed in a USB pen for insertion into a USB port onto the remote through which transception is conducted. The receiver and the transmitter can be based on RFID and are energized by a remote transmitter at the remote apparatus.

The query can be received from the remote apparatus, and is repeatedly transmitted, possibly according to a periodic basis.

The identifier can be a unique identifier, and access to the remote apparatus can be permitted only for a user associated with the unique identifier.

The access control device can further include the functionality of at least one of a cellular telephone and a personal digital assistant, the transmitter including a local transceiver complementary to a transceiver on the remote apparatus and through which the queries are received and the identifier is transmitted. The local transceiver can be based on at least one of a serial cable, a USB cable; infrared; Bluetooth®; 802.11; 802.16: RFID; and variants thereof.

Another aspect of the invention is a computer-readable data file storable on an access control device for a user. The data file includes authentication information for the user comprising a digital certificate respective to the user that includes an identifier for the user and a public key. The authentication information further comprises a user private key complementary to the public key. The authentication information is used in an initial transmission from the access control device to a remote apparatus in order to cause the remote apparatus to permit access for the user to the remote apparatus. The authentication information is also so that the remote apparatus can utilize the keys to establish a secure session for the user with a network entity connected to the remote apparatus. The identifier is also for at least one additional transmission from the access control device to the remote apparatus in order to cause the remote apparatus to maintain access for the user to the remote apparatus.

Another aspect of the invention provides an access control device including a microcomputer and a storage device for storing data file that includes authentication information for the user. The authentication information comprises a digital certificate respective to the user that includes an identifier for the user and a public key. The authentication information further comprises a user private key complementary to the public key. The authentication information is for an initial transmission from the access control device to a remote apparatus in order to cause the remote apparatus to permit access for the user to the apparatus. The remote apparatus is operable to utilize the keys to establish a secure session for the user with a network entity connected to the remote apparatus. The identifier is also for at least one additional transmission from the access control device to the remote apparatus, in order to cause the remote apparatus to maintain access for the user to the remote apparatus.

Another aspect of the invention provides a method of controlling access to an apparatus comprising:
  permitting access to the apparatus;
  transmitting a verification request to an access control device; and
  denying access to the apparatus if the access control device fails to respond to the verification request;
  whereby the permitting access to the apparatus continues if the access control device responds to the verification request.

The method can also comprise performing the transmitting step on a periodic basis.

Another aspect of the invention provides a method of accessing a remote apparatus comprising:
  transmitting identification information to the remote apparatus in order to cause the remote apparatus to permit access to the apparatus upon validation of the identification information; and,
  transmitting an identifier to the remote apparatus to cause the remote apparatus to maintain access.

The remote apparatus can be an activation mechanism for a machine operable to selectively permit a user to operate the machine. The machine can be selected from the group consisting of an automobile engine, automobile functionality (e.g. braking, ignition, gears), machinery, electronics, an Automatic Teller Machine, a door (such as a door to a restricted area), a switching mechanism for an electric light, a computer, a computer network, a personal digital assistant and a telephone.

Another aspect of the invention is an apparatus comprising a first input device for receiving user input representing a request to access the apparatus. The request includes authentication information. The apparatus further comprises a microcontroller connected to the first input device for receiving the authentication information and permitting access to the apparatus if the authentication information is validated. The apparatus further comprises an second input device for repeatedly receiving an identifier from an access control device. The microcontroller is operable to deny further access to the apparatus if the second input device fails to receive the identifier from the access control device within a predetermined criteria.

The first input device can be a keyboard and the authentication information can be a user-id and password entered into the keyboard. The first input device can further be a wireless receiver and the authentication information can be part of a wireless transmission from the access control device. The wireless receiver can be based upon infrared; Bluetooth®; 802.11; 802.16; CDMA; GSM; and variants thereof. The first input device alternatively be coupled to a wireless receiver and the authentication information could be part of a wireless transmission from the access control device. The second input device can be a wireless receiver and the identifier can be part of a wireless transmission from the access control device. The predetermined criteria can be a predetermined or configurable time interval.

The apparatus can further include an output device for repeatedly transmitting a verification request to the access control device. In this case, the predetermined criteria can be a time interval within which the access control device is to transmit the identifier to the second input device after the verification request is transmitted. The second input device and the output device could together be a transceiver. For example, the transceiver could be an RFID transceiver or variant thereof. The transceiver could also be a USB port and the access control device could be operable to connect to the USB port. The verification request can be transmitted at predetermined or configurable intervals of time.

The authentication information could include the identifier. The authentication information could include an encryption key associated with at least one of the access control device and the apparatus. The apparatus could be a gateway for a communications network operable to selectively permit a user to access the communications network. The microcontroller could be operable to use the encryption key to provide access to the communications network.

The identifier can be uniquely associated with the access control device. The microcontroller could be operable to access a look-up table in which the authentication information points to the identifier.

The apparatus could be a gateway for a communications network operable to selectively permit a user to access the communications network. The apparatus could be an activation mechanism for a machine operable to selectively permit a user to operate the machine. The machine could be selected from the group consisting of an automobile engine, automobile functionality, machinery, electronics, an Automatic Teller Machine, a door, a switching mechanism for an electric light, a computer, a computer network, a personal digital assistant and a telephone.

Another aspect of the invention provides a system for controlling access comprising a remote apparatus operable to transmit a request for an identifier and to permit access to the apparatus provided the remote apparatus continues to receive an identifier. The system for controlling access further comprises an access control device having a transmitter operable to repeatedly transmit the identifier to a remote apparatus upon receipt of the request. The remote apparatus can be an activation mechanism for a machine operable to selectively permit a user to operate the machine. The machine can be selected from the group consisting of an automobile engine, automobile functionality (e.g. braking, ignition, gears), machinery, electronics, an Automatic Teller Machine, a door (such as a door to a restricted area), a switching mechanism for an electric light, a computer, a computer network, a personal digital assistant and a telephone.

BRIEF DESCRIPTION OF THE DRAWINGS

The invention will now be described by way of example only, and with reference to the accompanying drawings, in which.

DETAILED DESCRIPTION OF THE INVENTION

Figure 1:
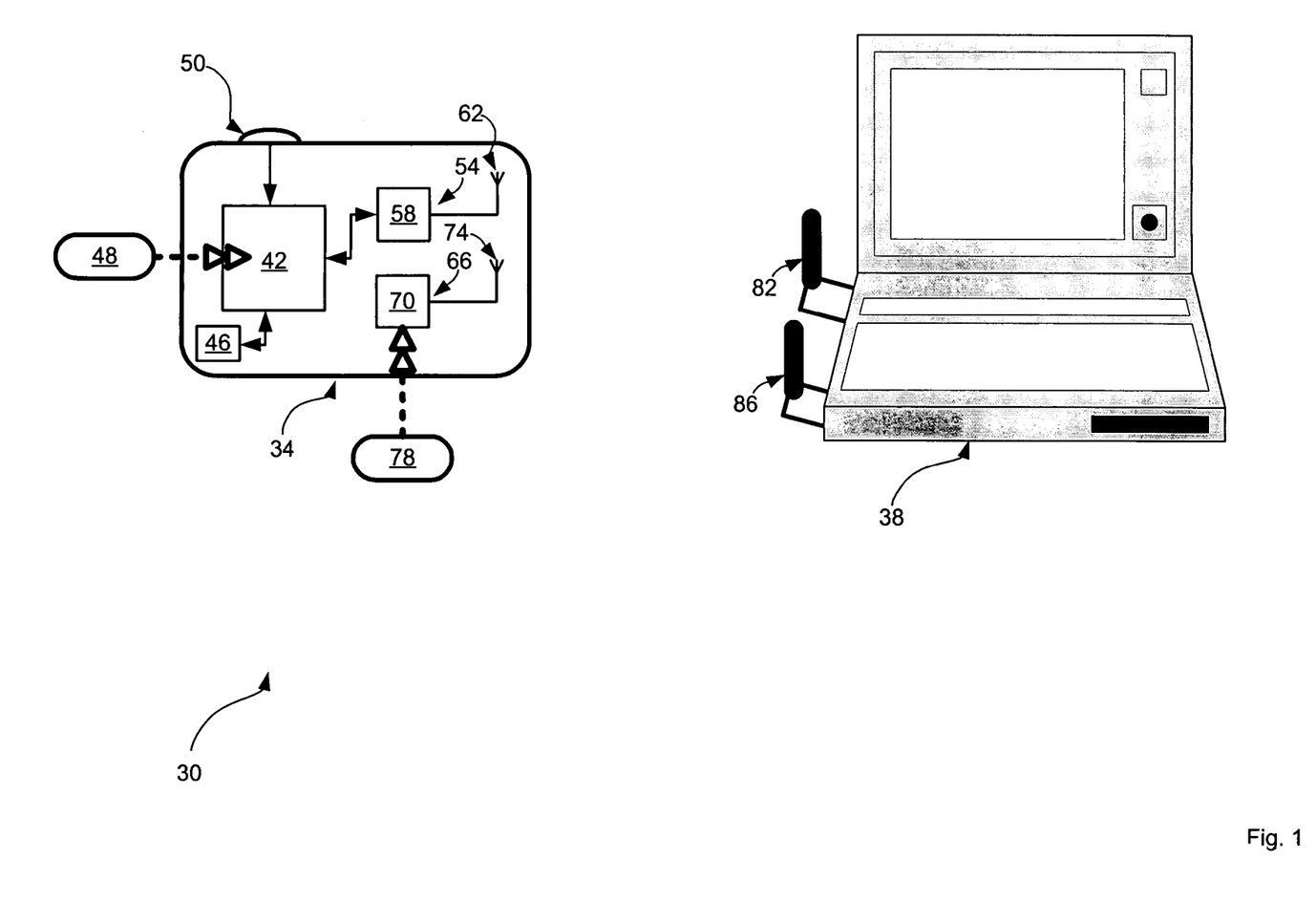
FIG. 1 is a schematic representation of a security access system in accordance with an embodiment of the invention.

Referring now to FIG. 1, a security access system is indicated generally at 30. System 30 includes a security access device 34 and a laptop computer 38.

While not required, it is presently preferred that the form-factor of security access device 34 render device 34 portable—for example, being attachable to a key-chain, or able to fit easily into the user's pocket, or readily wearable by the user. As shown in FIG. 1, security access device 34 is represented in block-diagram format, and thus it is to be understood that the appearance and shape of device 34 is not particularly limited. As will be explained in greater detail below, the user of device 34 is able to use device 34 to gain and maintain access to computer 38.

Device 34 contains a microcontroller 42 that is powered from a self-contained power supply 46, such as a lithium battery. Microcontroller 42 includes a processing unit (not shown) and a persistent storage device (not shown) that stores operating instructions (not shown) for operating microcontroller 42. The persistent storage device also stores data representing authentication information 48 that is specific to the user of device 34.

Microcontroller 42 is also connected to a push-button switch 50 (or other type of switch), which is activateable by a user of device 34 to send an activation signal to microprocessor 42. Microprocessor 42 is also connected to a first transmitter 54 that includes a radio 58 and an antenna 62. In a present embodiment, transmitter 54 is based on infrared technology, but in other embodiments other types of technologies can be used to implement transmitter 54. Other exemplary technologies include wireless technologies such as Bluetooth®, 802.11, Code Division Multiple Access ("CDMA") or wired technologies such as Universal Serial Bus ("USB"). Thus, upon receipt of an activation signal from switch 50, microprocessor 42 is operable to instruct transmitter 54 to transmit authentication information 48.

Device 34 also includes a second transmitter 66 that itself includes a radio 70 and an antenna 74. In a present embodiment, second transmitter 66 is based on radio frequency identification ("RFID") tag technology, is operable to transmit verification information 78 in response to a receipt of a request to transmit such information 78 in accordance with known functionality of RFID tag technology. (While transmitter 66 is based on RFID tag technology, in other embodiments other radio technologies can be employed as desired.)

Figure 2:
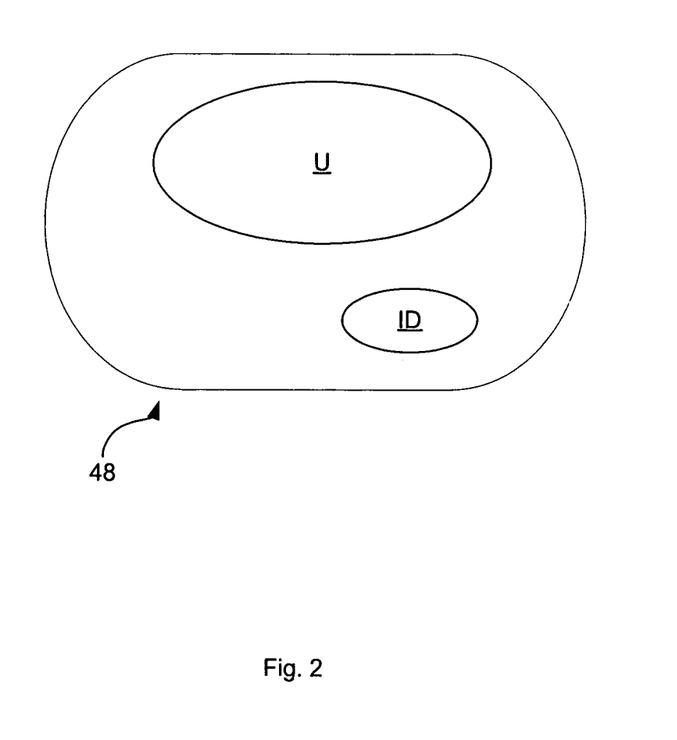
FIG. 2 is a representation of a data file containing authentication information that is stored on the security access device of FIG. 1.
Figure 3:
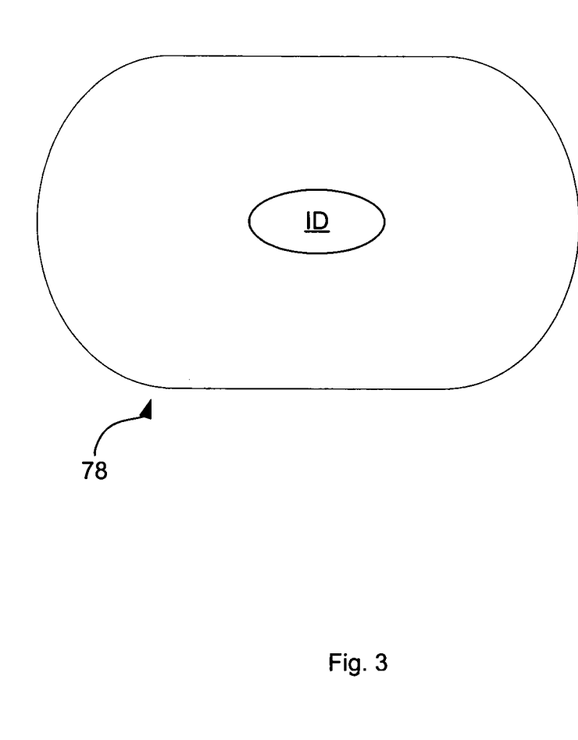
FIG. 3 is a representation of a data file containing verification information that is stored on the security access device of FIG. 1.

Referring now to FIG. 2, an example of the contents of authentication information 48 is shown. In a present embodiment, authentication information simply includes a username, indicated at reference "U", and a unique identifier indicated at reference "ID". (While in the present embodiment, username U and unique identifier ID are both used, it will become apparent that in other embodiments the unique identifier ID can serve as both the unique identifier and the username.) Username U is typically the user-id or username belonging to the user that owns device 34, and is assigned by an administrator of system 30 and therefore known to that administrator. Identifier ID is any unique string of characters, also typically assigned by an administrator of system 30 and known to that administrator. Referring now to FIG. 3, an example of the contents of verification information 78 is shown. In a present embodiment, verification information simply includes an identical copy of unique identifier ID.

Referring again to FIG. 1, laptop 38 is based on any known computing environment, comprising any desired combination of input devices, output device, microprocessor(s), random-access memory, storage devices, etc. and executing any desired operating system appropriate to the hardware environment of laptop 38. While the present embodiment utilizes a laptop computer 38, it is to be understood that in other embodiments a variety of other types and configurations of computing devices are contemplated, including personal computers, personal digital assistants, telephony devices etc. In still other variants on the present embodiment, the computing device may be linked to some other device, such as a car engine to thereby restrict access to a car, or an electromechanical door to thereby restrict access to certain areas in a building.

Laptop 38 is preprogrammed by an administrator of system 30 with a list of known usernames that are permitted to access laptop 38, and also includes a list of passwords that are uniquely associated with that username. In particular, laptop 38 is preprogrammed to specifically include username U and a password associated therewith. Laptop 38 also includes a first transceiver 82 that is complementary to transmitter 54, and is thus operable when laptop 38 is 'on' to receive and decipher transmissions from transmitter 54. Thus, in a present embodiment, transceiver 82 is also based on infrared technology in order to complement transmitter 54. Laptop 38 also includes a second transceiver 86 that is complementary to transmitter 66, and thus operable when laptop 38 is 'on' to periodically query transmitter 66 and receive and decipher transmissions from transmitter 66 in accordance with techniques known in RFID technology.

Figure 4:
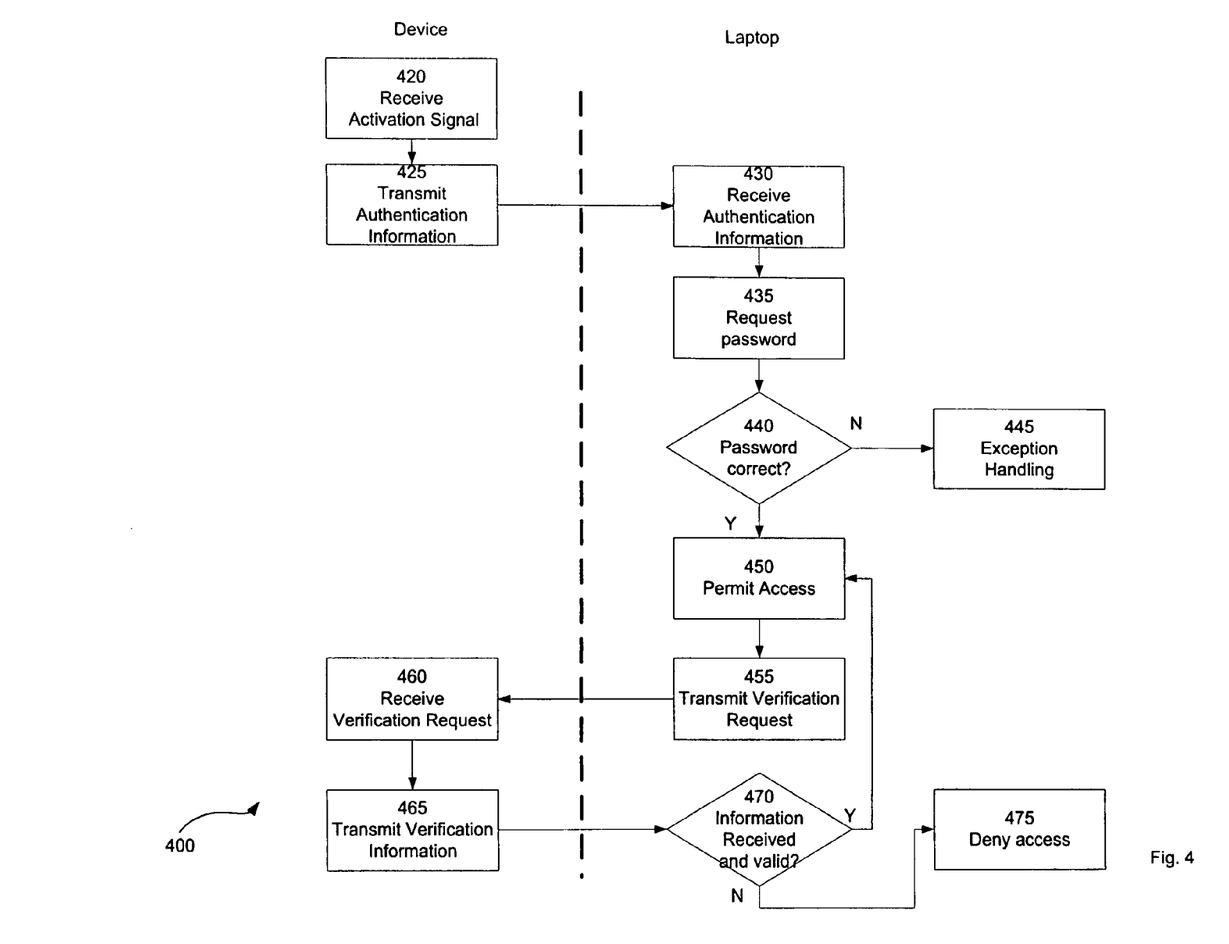
FIG. 4 is a flowchart depicting a security access method in accordance with another embodiment of the invention.

Reference will now be made to FIG. 4 which shows a flowchart depicting a security access method which is indicated generally at 400. In order to assist in the explanation of the method, it will be assumed that method 400 is performed using system 30. However, it is to be understood that system 30 and/or method 400 can be varied, and need not work exactly as discussed herein in conjunction with each other, and that such variations are within the scope of the present invention.

Before discussing method 400, certain assumptions will be made about the state of system 30. In particular, it is assumed that an authorized user is in possession of device 34 and that the user is proximal to laptop 38. Additionally, it is assumed that laptop 38 is 'on', but that no users are currently logged into the laptop 38. It is further assumed that the user possessing device 34 is identified in a list of authorized users resident in laptop 38, including a password associated with that user.

Figure 5:
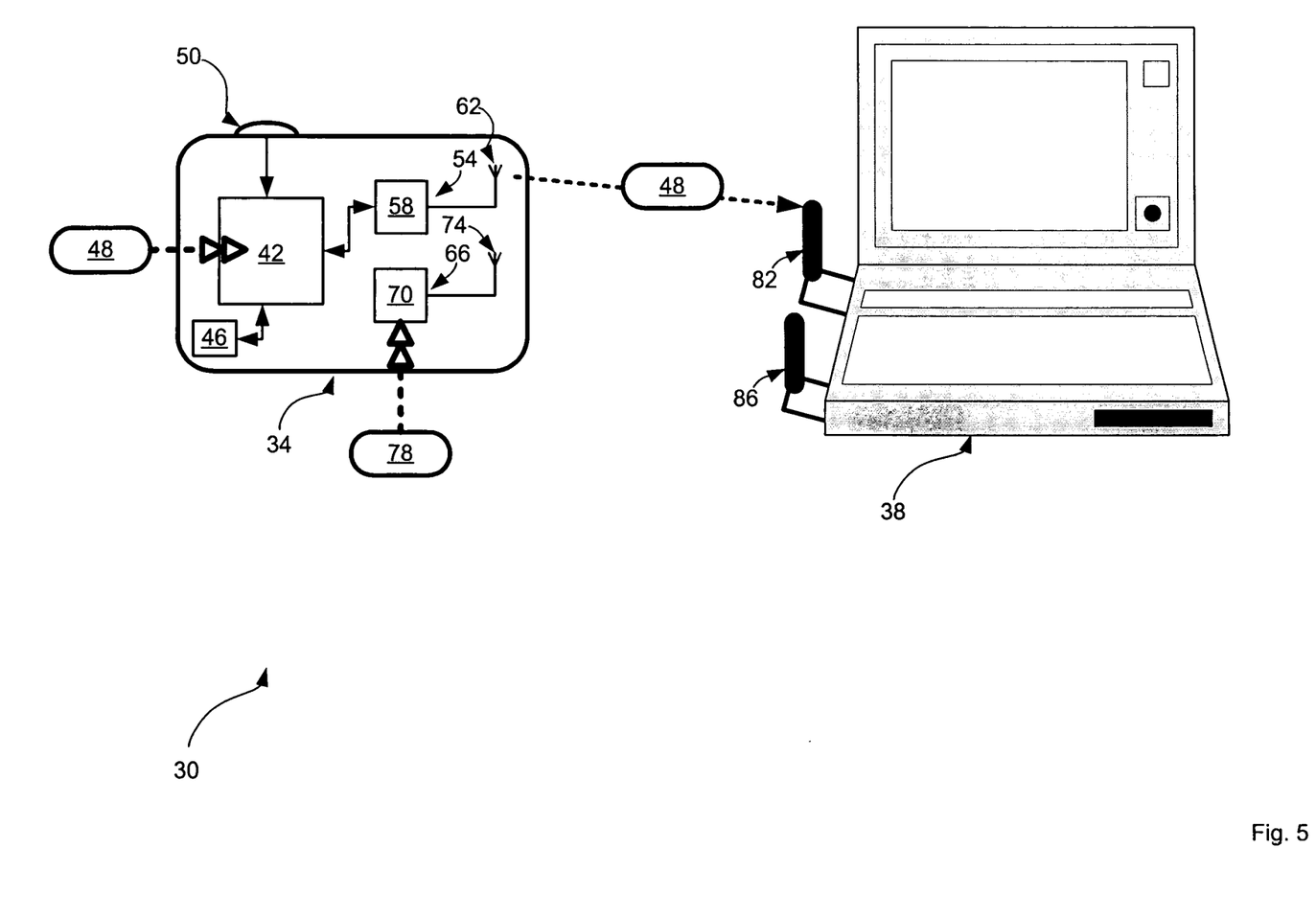
FIG. 5 shows the system of FIG. 1 during the performance of one of the steps in the method shown in FIG. 4.

Beginning first at step 420, an activation signal is received. To perform this step, the user will depress switch 50 on device 34, causing a signal to be sent to microprocessor 42. Next, at step 425, microprocessor 42 will send authentication information 48 to transmitter 54, which in turn will transmit authentication information 48 to transceiver 82 on laptop 38. This step is represented in FIG. 5, as authentication information 48 is depicted as being transmitted to from transmitter 54 to transceiver 82.

Figure 6:
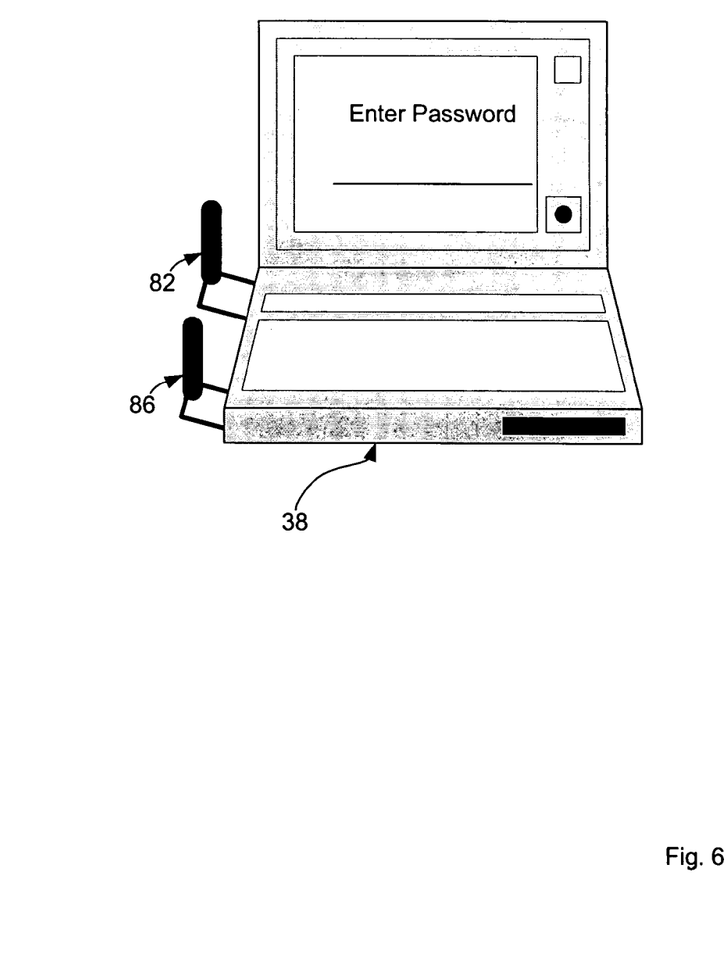
FIG. 6 shows the system of FIG. 1 during the performance of one of the steps in the method shown in FIG. 4.

Next, at step 430, the authentication information transmitted at step 425 is received at laptop 38. Next, at step 435, a password is requested from the user. (While a password is requested in the present embodiment, in other embodiments the password request can be eliminated or substituted for other security measures.) This step is performed by laptop 38 which displays a message on the screen of laptop 38 prompting the user to enter in a password. This step is represented in FIG. 6, with laptop 38 displaying the message "Enter Password".

Once the password request at step 435 has been fulfilled (i.e. the user has entered a password), a determination is made at step 440 as to whether the password that was entered was correct. (While not required, as an additional verification it can be desired to have laptop 38 also ensure that the received unique identifier ID within authentication information 48 is an identifier ID that is expected for the corresponding username U.) This determination is made by laptop 38, which examines the received username U and looks up the password that is associated with that username U. If the password is incorrect, then the method advances to step 445 for exception handling. The exception handling can take any desired form, typically at least involving denying the user further access to laptop 38. Further exception handling could include permanently disabling the account associated with the username U, or any other steps that may be desired. (Alternatively, the user may be given a number of attempts to enter the correct password before the method advances to step 445 for exception handling.) However, if the password entered at step 435 was correct, then at step 440 it will be determined that a correct password was entered and method 400 will advance to step 450, at which point access to laptop 38 will be granted, and the user can interact with laptop 38 in the usual manner, as if the user had logged in using traditional means. Such interaction may provide the user with full access to laptop 38, or to a limited account on laptop 38, or the interaction may have any other desired level of security access.

Figure 7:
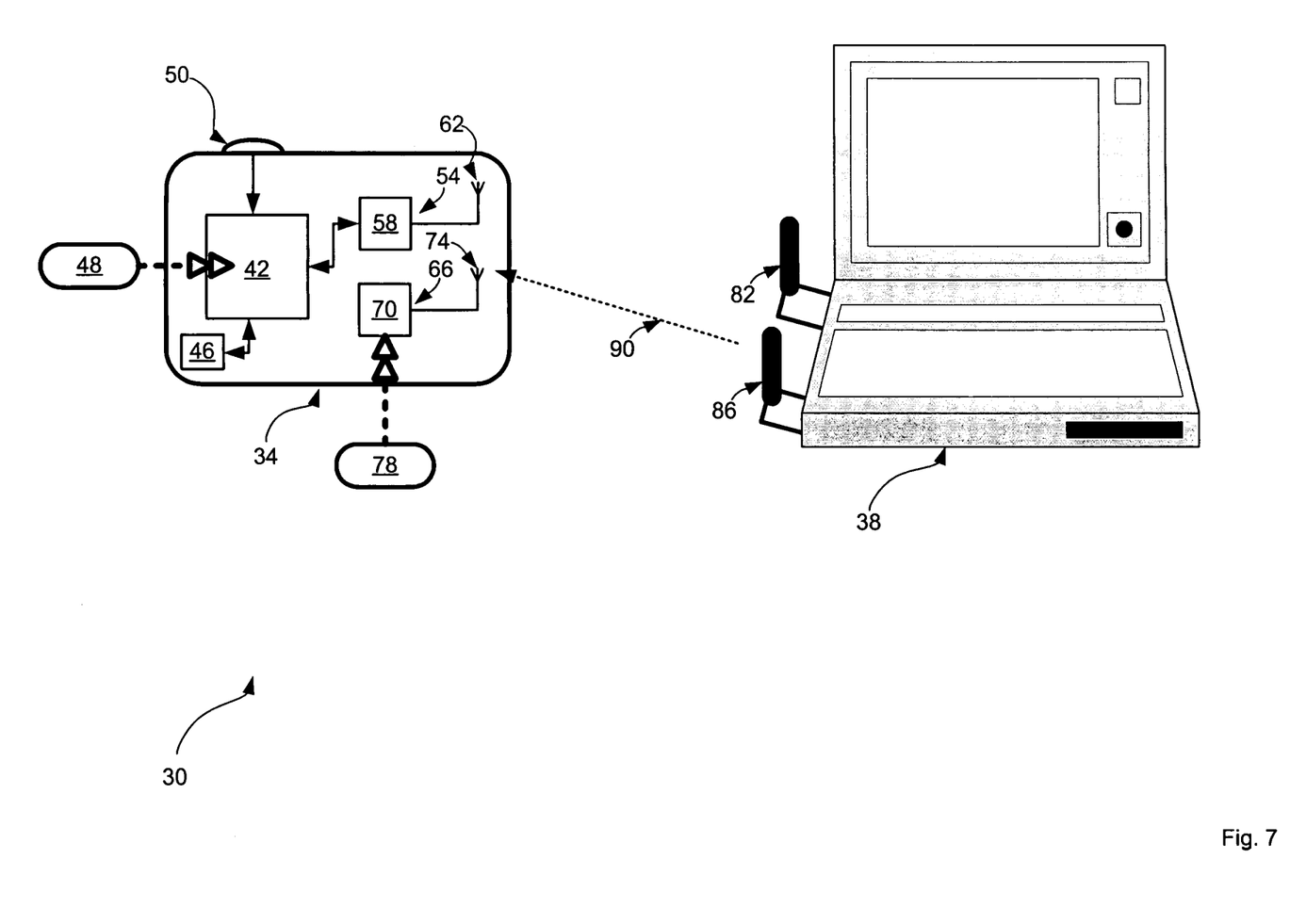
FIG. 7 shows the system of FIG. 1 during the performance of one of the steps in the method shown in FIG. 4.

Method 400 then advances to step 455, at which point a verification request is transmitted. This step is performed by laptop 38, which at this point activates transceiver 86 and transmits a request for access verification. Next, at step 460, the verification request is received by device 34 through transmitter 66. Steps 455 and 460 are represented in FIG. 7, as the transmitted and received verification request is represented by the dotted line indicated at reference 90. More specifically, the verification request 90 includes a request that the unique identifier ID be retransmitted by device 34 to confirm that device 34 is still proximal to laptop 38, and that therefore the user is also still proximal to laptop 38 and therefore continued access to the laptop 38 should be permitted.

Figure 8:
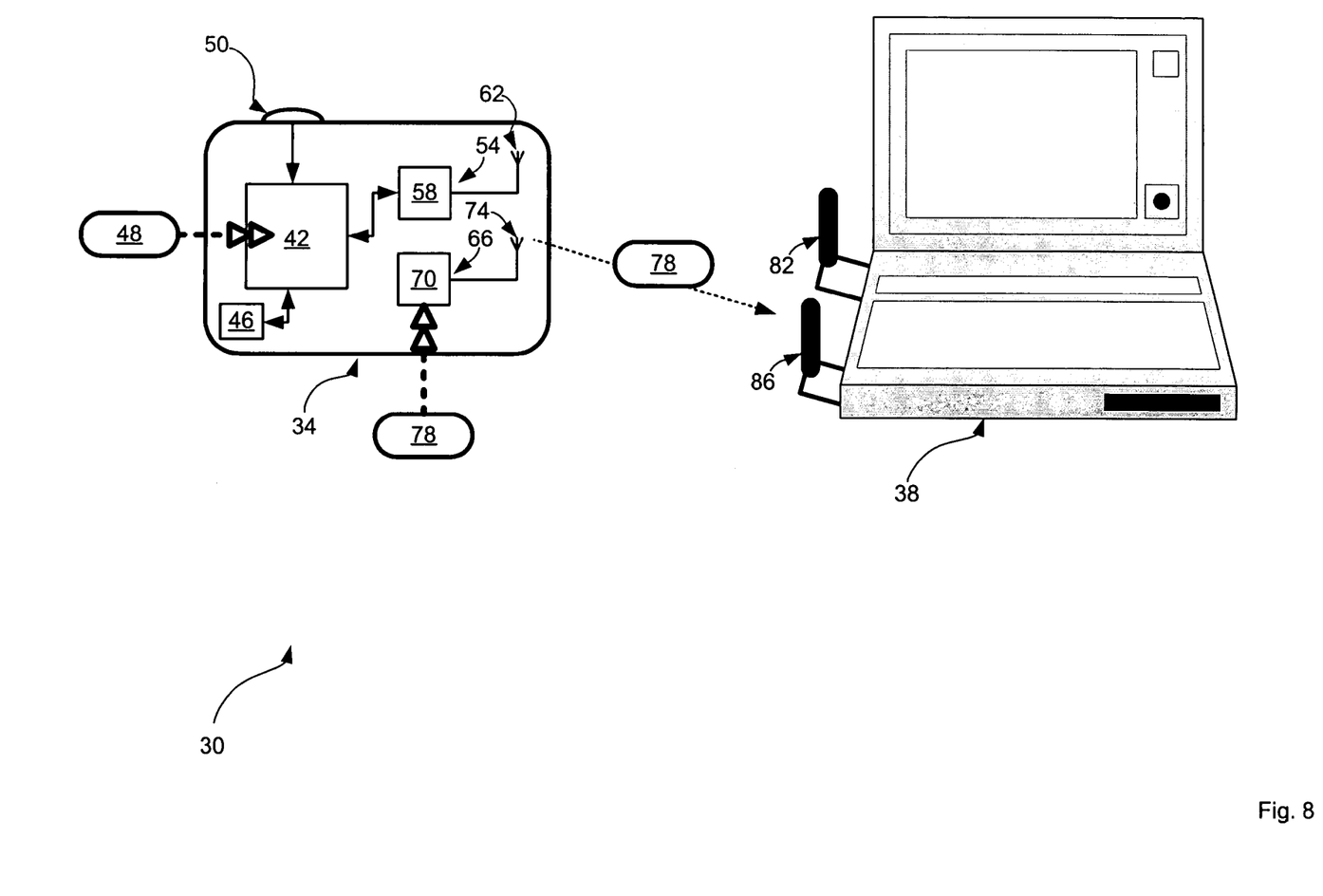
FIG. 8 shows the system of FIG. 1 during the performance of one of the steps in the method shown in FIG. 4.

Next, at step 465, transmitter 66 transmits verification information 78 to laptop 38. This step is represented in FIG. 8, as verification information 78 is depicted as being transmitted from transmitter 66 to transceiver 86.

Those of skill in the art will appreciate that, since transmitter 66 and transceiver 86 are based on RFID, the energy used to perform step 465 is derived from the excitation energy of verification request 90, and therefore the performance of steps 460 and 465 do not present a drain on power supply 46.

Next, at step 470, the verification information 78 transmitted at step 465 is received at laptop 38 and its validity determined. More specifically, in the present embodiment the unique identifier ID will now have been received by laptop 38 and laptop 38 can compare the unique identifier ID received within authentication information 48 received at step 430 with the unique identifier ID received within the verification information 78 received at step 470.

If, at step 470, no verification information is received within a predefined time period, then method 400 advances to step 475 and further access to laptop 38 will be denied. However, if at step 470 it is determined that the received verification information included the unique identifier ID within authentication information 48 received at step 430, then it will be determined that there is a verification and method 400 will cycle back to step 450 where ongoing access is permitted. The cycling between steps 450 and 470 will continue, over such an interval as may be desired by a person configuring system 30, until such time as the user owning device 34 either: a) leaves the proximity of laptop 38 such that at step 470 it is determined that no verification information was received, and therefore device 34 is out of range of laptop 38, or b) the user ceases to access laptop 38 by some other means, such as shutting off laptop 38, manually logging out of laptop 38, or by sending an additional wireless signal from device 34 upon depression of switch 50, where the additional wireless signal indicates a desire to log out of laptop 38, or the like.

It should now be understood that the denial of access at step 475 can take several forms. For example, it could start with a permanent or time-limited "lock out" status, where upon return to laptop 38 the user can be given the option of reentering their password. Alternatively, where step 475 is reached by device 34 leaving the wireless transmission range of laptop 38, then access to laptop 38 can be returned merely by having laptop 38 once again detect the presence of device 34.

Figure 9:
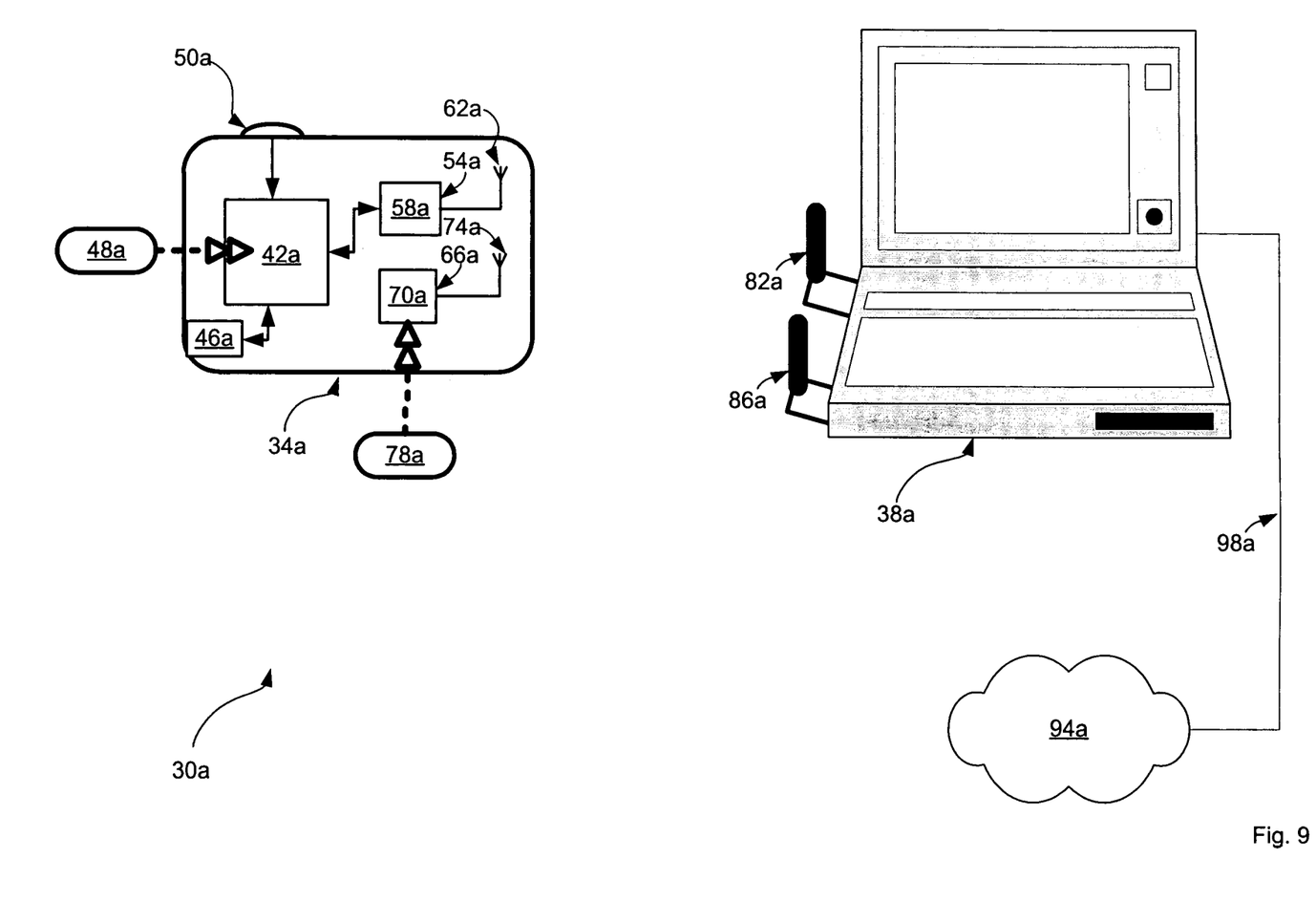
FIG. 9 is a schematic representation of a security access system in accordance with another embodiment of the invention.

Referring now to FIG. 9, a security access system in accordance with another embodiment of the invention is indicated generally at 30a. System 30a includes several components that are substantially the same as system 30, and thus like components in system 30a to components in system 30 bear the same reference, but followed by the suffix "a". Of particular note, system 30a includes a network 94a that connects to laptop 38a via a link 98a. Network 94a can be the Internet, an intranet, a local area network, a wide area network, one or more remote servers or any combination thereof to which laptop 38a connects. Link 98a can be any type of connection, including wireless links based on, for example, 802.11 and its variants. Bluetooth®, Code Division Multiple Access ("CDMA"), or Global System for Mobile Communications ("GSM") or any other type of wireless connection. Link 98a can also be a wired connection based on, for example, Ethernet, coaxial, twisted pair etc.

Figure 10:
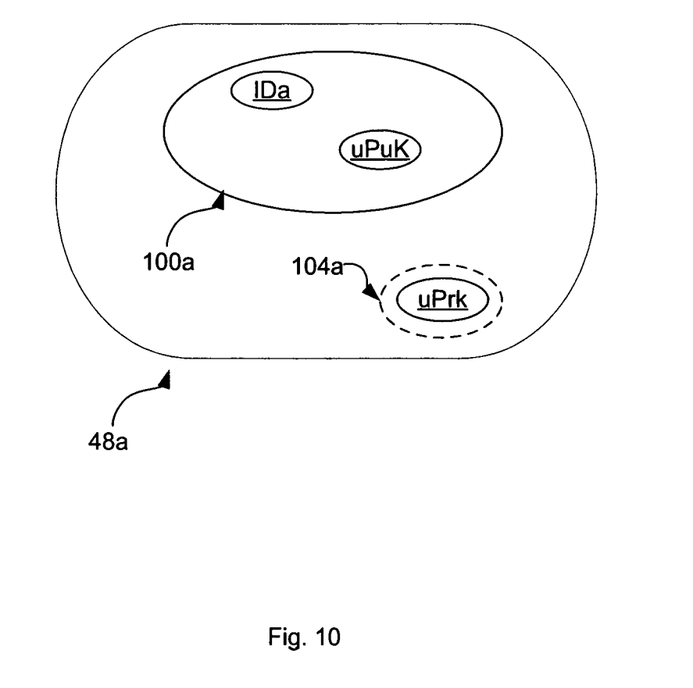
FIG. 10 is a representation of a data file containing authentication information that is stored on the security access device of FIG. 9.

Referring now to FIG. 10, authentication information 48a for system 30a is shown in greater detail. Authentication information 48a includes a digital certificate 100a that belongs to the user that owns device 34a. Certificate 100a includes a unique identifier IDa and a user public key uPuK. While not shown in FIG. 10, certificate 100a and/or authentication information 48a can also include the name of the user and any other information that may be desired.

Figure 11:
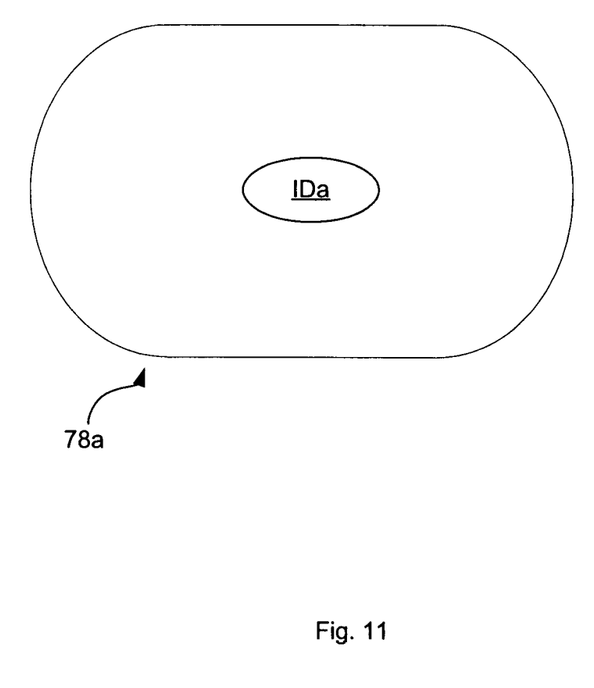
FIG. 11 is a representation of a data file containing verification information that is stored on the security access device of FIG. 9.

Authentication information 48a also includes a user private key uPrK that is complementary to user public key uPuK. User private key uPrK is stored in an encrypted format inside authentication information 48a, the encryption being denoted by the dotted ellipse surrounding user private key uPrK indicated at reference 104a. Referring now to FIG. 11, verification information for system 30a includes unique identifier IDa, being identical to unique identifier IDa stored in certificate 100a to achieve the same result as described above in relation to system 30.

Reference will now be made again to FIG. 4 depicting security access method 400. During this explanation of method 400, it will be assumed that method 400 is performed using system 30a.

Before discussing method 400, certain assumptions will be made about the state of system 30a. In particular, it is assumed that an authorized user is in possession of device 34a and that the user is proximal to laptop 38a. Additionally, for the purposes of assisting in explanation of the method, it will be assumed that laptop 38a is 'on', but that no users are currently logged into the laptop 38a or any service to which laptop 38a connects in network 94a. It is further assumed that the user possessing device 34a intends to access services available on network 94a via laptop 38a and link 98a. It is further assumed that the identity of the user possessing device 34a is to be authenticated using digital certificate 100a on both laptop 38a and by any service being accessed on network 94a.

Figure 12:
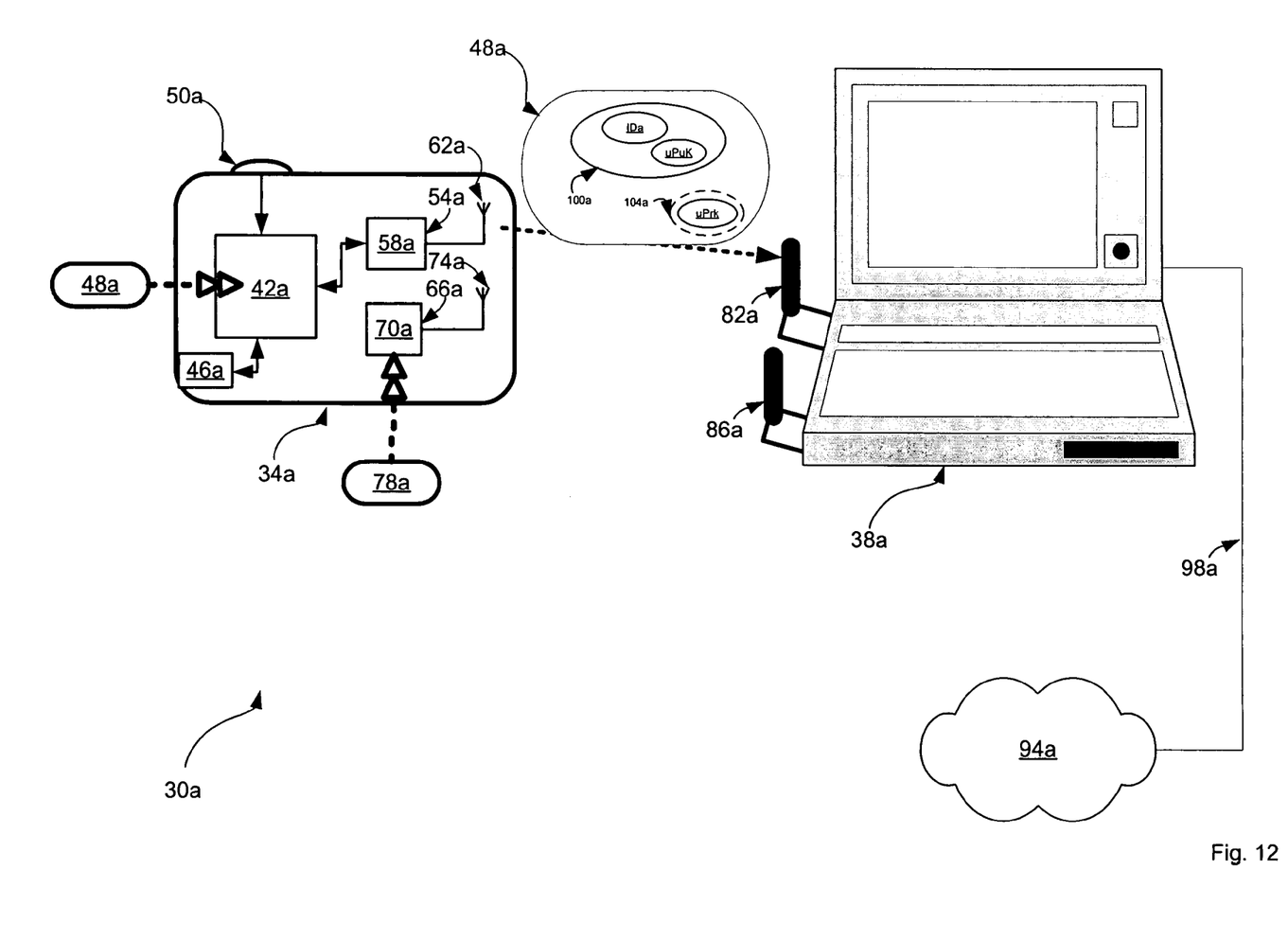
FIG. 12 shows the system of FIG. 9 during the performance of one of the steps in the method shown in FIG. 4; and, FIG. 13 is a schematic representation of a security access system in accordance with another embodiment of the invention.

Beginning first at step 420, an activation signal is received. To perform this step, the user will depress switch 50a on device 34a, causing a signal to be sent to microprocessor 42a. Next, at step 425, microprocessor 42a will send authentication information 48a to transmitter 54a, which in turn will transmit authentication information 48a to transceiver 82a on laptop 38a. This step is represented in FIG. 12, as authentication information 48a is depicted as being transmitted to from transmitter 54a to transceiver 82a.

Next, at step 430 the authentication information 48a transmitted at step 425 is received at laptop 38a. Next, at step 435, a password is requested from the user by laptop 38a.

Once the password request at step 435 has been fulfilled (i.e. the user has entered a password), a determination is made at step 440 as to whether the password that was entered was correct. This determination is made by laptop 38a, which determines whether user private key uPrK was correctly decrypted by the password provided at step 435. If the password is incorrect, then the method advances to step 445 for exception handling. The exception handling can take any desired form, typically at least involving denying the user further access to laptop 38. Further exception handling could include permanently causing certificate 100a to be revoked in a certificate list kept in laptop 38a and notifying any other relevant certificate lists kept on network 94a. Any other steps that may be desired may also be taken. (Alternatively, the user may be given a number of attempts to enter the correct password before the method advances to step 445 for exception handling.)

(Notwithstanding the foregoing paragraph, it is to be understood that the use of a password in the present embodiment is merely exemplary to assist in understanding of the method, but it should be understood that in other embodiments the password can be eliminated and corresponding changes to method 400 can be effected to accommodate this variation. Other types of authentication can be used in lieu of, or in addition to, the use of a password, such as biometric information.)

However, if the password entered at step 435 was correct, then at step 440, then user private key uPrK will be successfully decrypted, at which point the method will advance to step 450 and access will be permitted, giving the user access to both laptop 38a and to network 94a based on a predefined level of security access. In general, once certificate 100a and user private key uPrK are on laptop 38a, the storage and management of certificate 100a and user private key uPrK can be handled in any known or desired manner.

Method 400 then advances to step 455 and the remainder of the performance of method 400 is substantially as previously described, in relation to system 30. In particular, the user will continue to be permitted to access laptop 38a as long as the verification information requested from transmitter 66a is received as it is periodically requested by transceiver 86a.

It should now be apparent that a variant on method 400 as it is performed on system 30a can include using keys uPuK and uPrK to establish a secure link 98a between laptop 38a and a service on network 94a. For example, once laptop 38a has certificate 100a, it can transmit certificate 100a to any service on network 94a. Once a service verifies that certificate 100a has not been revoked, that service can then use the user public key uPuK to encrypt communications with laptop 38a, which in turn can decrypt those communications using the user private key uPrK. As a further level of security, the initial use of keys uPuK and uPrK between laptop 38a and a service on network 94a can be for the purpose of letting that service establish a set of session keys to be used for the time that the user is logged into to laptop 38a—such session keys expiring once step 470 establishes that "no", device 34a is no longer in proximity to laptop 48a, or has not been in proximity for some predefined period of time. Such security can take this or any other any desired form, including the techniques described in International Patent Application PCT/CA04/0455 filed Mar. 26, 2004, contents of which are incorporated herein by reference.

In system 30a, transceiver 82a and transceiver 86a are both locally situated on laptop 38a, yet in other embodiments transceiver 82a and transceiver 86a can be situated on different apparatuses that can be linked to each other. For example, and referring now to FIG. 13, a security access system in accordance with another embodiment of the invention is indicated generally at 30b. System 30b includes several components that are substantially the same as system 30a, and thus like components in system 30b to components in system 30a bear the same reference, but followed by the suffix "b". Of particular note, the functionality of device 34b is integral with a cellular telephone (the form factor of which is not reflected in FIG. 13). Also of note is that system 30b includes a cellular telephone tower 82b that is connected to network 94b. Tower 82b is operable to perform all regular functions of a cellular telephone tower, but is also operable to perform substantially the same the functions of transceiver 82a via the connection between tower 82b to laptop 38b via network 94b.

Figure 13:
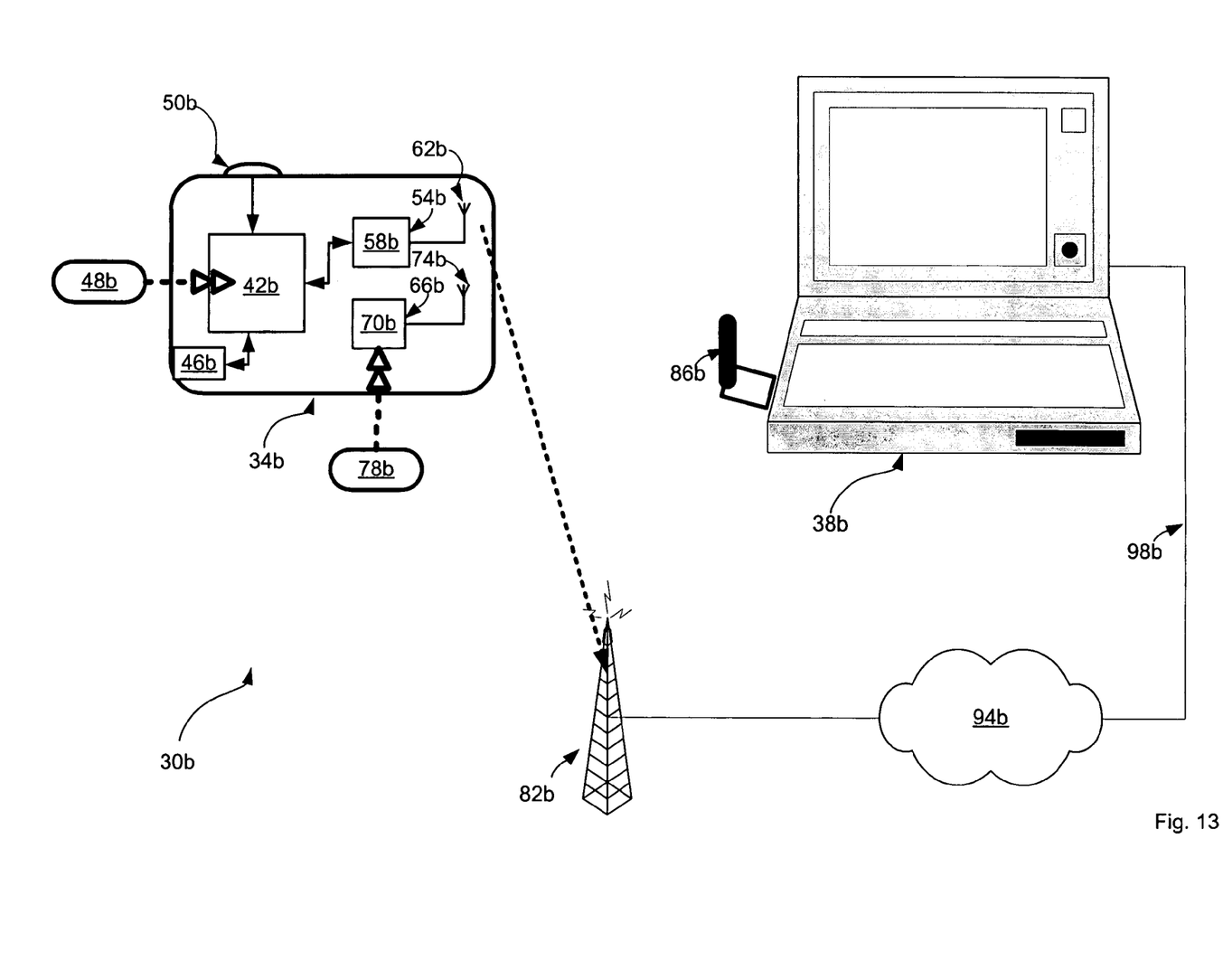

Thus, as part of the cellular telephone functions of device 34b, device 34b is operable to communicate with tower 82b More particularly, tower 82b and transmitter 54b are thus operable to communicate wirelessly via Code Division Multiple Access ("CDMA"), or Global System for Mobile Communications ("GSM") or similar wireless protocols. Other wireless standards such as Bluetooth®, 802.11 or 802.16, their variants and subsequent similar standards could also be utilized to communicate between tower 82b and transmitter 54b. In system 30b, initial access to laptop 38b can be effected by an initial communication from transmitter 54b that is carried via tower 82b and network 94b to laptop 38b. Ongoing permission to access laptop 38b is verified via communications between transceiver 86b and transmitter 66b in substantially the same manner as previously described in relation to system 30. Other configurations of transceivers 82b and 86b will now occur to those of skill in the art.

While only specific combinations of the various features and components of the present invention have been discussed herein, it will be apparent to those of skill in the art that desired subsets of the disclosed features and components and/or alternative combinations of these features and components can be utilized, as desired. For example, the first and second transmitters in device 34 can be based on a variety of different transmitters. Of particular note, the power consumption by the transmitter transmitting verification information is typically less (or even substantially nil) in comparison to the power consumption by the transmitter transmitting the authentication information.

As another example, it should be noted that the use of a unique identifier ID is contemplated in FIGS. 2 and 3, and the accompanying embodiments, but it is to be understood that in other embodiments that identifier ID need not be unique—even though such uniqueness can be desired to provide security. By the same token, it should be understood that the identifier ID in authentication information 48 need not be identical to the identifier ID in verification information 78. Authentication information 48 could include a completely different identifier than verification information 78, while still permitting device 34 to be used to control access to laptop 38. By the same token, where the identifiers in authentication information 48 and verification information 78 are different, laptop 38 can, if desired, include a look-up table that contains both the identifier stored in authentication information 48 and the identifier stored in verification information 78, whereby the laptop 38 can derive the identifier for verification information 78 by examining a corresponding entry on the look-up table for authentication information 48.

Alternatively, in other embodiments transmitter 54 could be based on wired technology. For example, device 34 could include a universal serial bus ("USB") plug, which when plugged into laptop 38 allowed the performance of steps 410-425 of method 400, such that the authentication information is sent to laptop 38 in a wired manner. When the USB plug is removed from laptop 38, the second transmitter 66 would periodically provide verification information in substantially the same manner as previously described.

In other embodiments the security access device 34 could be used to selectively permit (or otherwise regulate) access to other machines other than laptop 38, in order to provide secure access to such machines. Such machines could include an automobile engine, automobile functionality (e.g. unlocking brakes, enabling ignition, enabling engagement of gears), machinery (e.g. factory equipment), electronics (e.g. TV, stereo), an Automatic Teller Machine, a door (such as a door to a restricted area), a switching mechanism for an electric light, a computer network, a personal digital assistant and a telephone. In the latter example of a telephone, the security access device 34 could be used to authenticate the user's rights to make toll telephone calls on the telephone, and to provide a way of identifying that user for later billing. In a landline telephone, such toll calls could include long distance calls, whereas in a cellular telephone, calls toll calls could be for air-time and/or long distance calls. In the example of a computer network, the security access device 34 could be a gateway device that provides access to the network. Other machines will now occur to those of skill in the art.

As a still further example of variations, system 30 can be modified to omit transmitter 54 and transceiver 82, and thereby also omit the accompanying functionality of initially receiving and utilizing authentication information to grant initial permission to access laptop 38. In this variation, transceiver 86 and transmitter 66 would simply work together to demonstrate continued proximity of the modified version of device 34 in relation to laptop 38, and therefore continued rights for the user to access laptop 38. In such a variation, only step 450 to step 475 of method 400 would be performed. In such a variation, the initial permission to access laptop 38 would be effected in a different manner—for example, by having the user log into laptop 38 in the traditional manner of entering a user-id and password at a log-in screen—but ongoing access to laptop 38 would only be permitted where the laptop 38 continues to receive valid verification information from the modified device 34.

In yet further embodiments of the present invention, steps 455 and 460 could be removed from the method 400 of FIG. 4. In these embodiments, the device 34 performs step 465 of transmitting verification information to the laptop 38 without prompting from laptop 38. For instance, the transmission of the verification information could be conducted by the device 34 at predetermined time intervals, as a response to a predefined schedule or as a response to a configurable schedule set by the device 34, the laptop 38 or another element such as a network management tool. In these embodiments, the transmission of step 465 could be accomplished using a number of transmission techniques as previously described including infrared, Bluetooth®, 802.11, 802.16, or their variants and other local wireless standards or using a wireline technology such as USB or serial data bus. In these embodiments, the battery of the device 34 would likely deplete faster than some embodiments described previously which utilize RFID technology to energize the transmission of step 465.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A non-transient computer-readable storage medium storing at least one data file for an access control device for a user, said at least one data file including authentication information for said user comprising a digital certificate respective to said user that includes an identifier for said user and a public key; said authentication information further comprising a user private key complementary to said public key; said authentication information being for an initial transmission from said access control device to a remote apparatus in order to cause said remote apparatus to permit access for said user to said remote apparatus and such that said remote apparatus can utilize said keys to establish a secure session for said user with a network entity connected to said remote apparatus; said identifier also being for at least one additional transmission from said access control device by a radio frequency identification (RFID) circuit to said remote apparatus in order to cause said remote apparatus to maintain access for said user to said remote apparatus, the RFID circuit energized by a radio frequency (RF) signal from the remote apparatus.

2. An access control device including a microcomputer and a storage device for storing at least one data file including authentication information for a user; said authentication information comprising a digital certificate respective to said user that includes an identifier for said user and a public key; said authentication information further comprising a user private key complementary to said public key; said authentication information being for an initial transmission from said access control device to a remote apparatus in order to cause said remote apparatus to permit access for said user to said apparatus and such that said remote apparatus can utilize said keys to establish a secure session for said user with a network entity connected to said remote apparatus; said identifier also being for at least one additional transmission from said access control device by a radio frequency identification (RFID) circuit to said remote apparatus in order to cause said remote apparatus to maintain access for said user to said remote apparatus, the RFID circuit energized by a radio frequency (RF) signal from the remote apparatus.

* * * * *